United States Patent Office 2,850,311
Patented Sept. 2, 1958

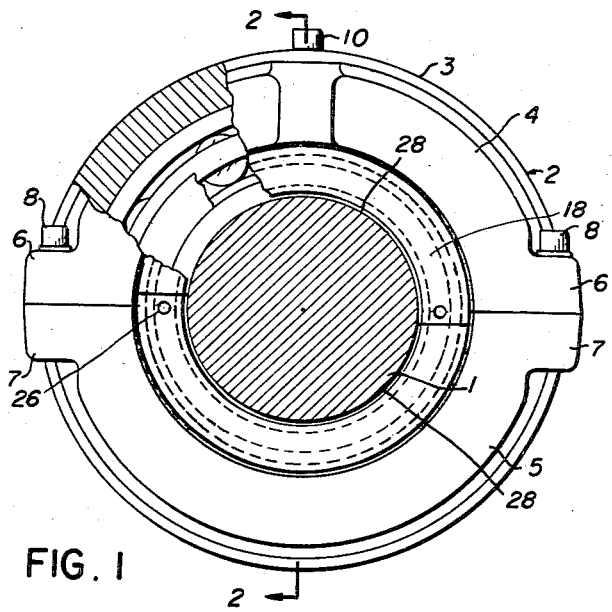
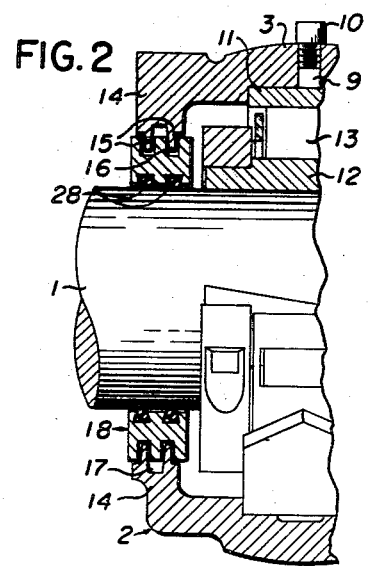
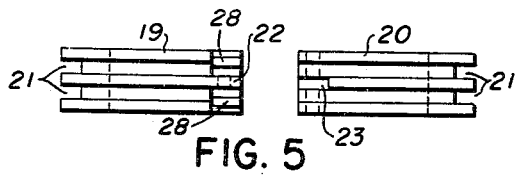
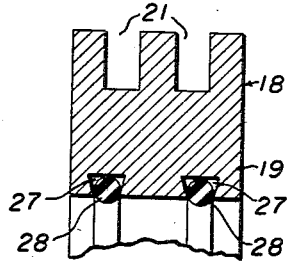
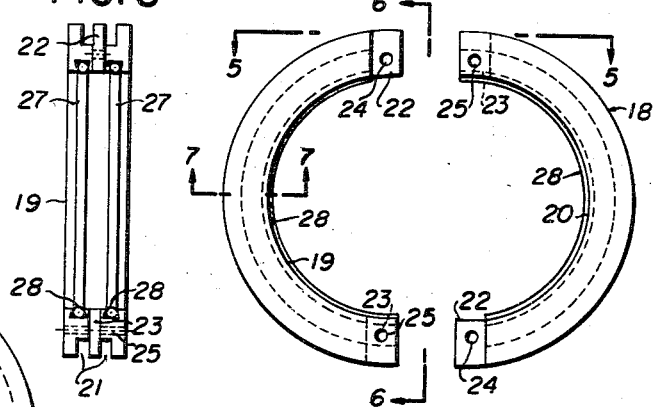
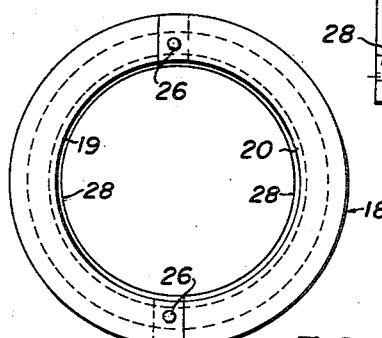
INVENTOR.
ROLAND M. MANSFIELD,
BY
ATTORNEY

2,850,311

GREASE AND OIL SEAL

Roland M. Mansfield, Fairfield, Conn., assignor to Tek Bearing Company, Bridgeport, Conn., a corporation of Connecticut Application May 18, 1954, Serial No. 430,605

3 Claims. (Cl. 288—13)

This invention relates to annular seals and more particularly to new and useful improvements in a grease and oil sealing ring for use with a split bearing.

A prime object of the present invention is to provide a sealing ring of this character which is capable of being installed and removed from a split bearing on a shaft without the necessity of disturbing the shaft or of disturbing or removing any of the machine elements, such as gear wheels, drums and the like on the shaft at the sides of the bearing.

Another object of the invention is to provide a sectioned sealing ring with improved means for fastening the two halves of the ring.

A further object of the invention is to provide a sealing ring of this character with improved means for mounting resilient O-rings in operative position.

Still another object of the invention is to provide a sealing ring with resilient O-rings for tightening the sealing ring on the shaft even though the shaft be slightly undersized.

Yet another object of the invention is to provide a sealing ring of this character with resilient O-rings in grooves to serve as a driver for locking the sealing ring on the shaft so that the flinger portion of the sealing ring rotates with the shaft.

It is further proposed to provide a sealing ring for use with a split roller bearing which is simple and rugged in construction and which can be manufactured and sold at a reasonable cost.

Other objects and advantages of the invention will be apparent from the description thereof to follow taken in connection with the accompanying drawing in which—

Figure 1 is a cross-sectional view through a shaft with a roller bearing structure mounted thereon having a sealing ring embodying the invention, parts being shown broken away.

Figure 2 is a vertical sectional view taken on the plane of the line 2—2 of Figure 1.

Figure 3 is an elevational view of the assembled sealing ring of Figure 1 removed from the roller bearing.

Figure 4 is an elevational view of the sealing ring of Figure 3, with the parts separated from one another.

Figure 5 is a plan view of the sealing ring looking in the direction of the line 5—5 of Figure 4.

Figure 6 is an edge view of the sealing ring looking in the direction of the line 6—6 of Figure 4.

Figure 7 is a cross-sectional view of the sealing ring looking in the direction of line 7—7 of Figure 4.

Referring in detail to Figures 1 and 2 of the drawing, a movable shaft 1 is shown on which is mounted a Cooper type roller bearing structure indicated generally at 2. The roller bearing structure includes an annular housing 3 composed of two complementary sections 4 and 5 having laterally projecting ear portions 6 and 7, respectively, detachably fastened together by bolts 8. The housing is formed at its central top portion with an inlet 9 for lubricant, such as grease or oil, and is normally closed by a plug 10. Inside the housing there are outer and inner raceways 11 and 12, respectively, for rollers 13.

The housing is formed with a flanged cartridge portion 14 at each end (only one end being shown) and formed on the inner periphery of said portion 14 are two projecting annular flanges 15 and 16 with an annular groove 17 therebetween.

According to the present invention, a sealing ring 18, substantially square in cross-section, and preferably formed of aluminum is interposed between the portion 14 and the shaft 1. This ring may however be made of steel or die cast alloy and is composed of two mating sections 19 and 20. Each section is formed with a plurality of closely spaced grooves 21 on its outer peripheral surface extending the entire length of the section. At one end, each section is formed with a projecting tongue member 22, centrally of the thickness of the section, and at the opposite end is formed with a central recess or groove 23, said tongue and groove being disposed parallel to the plane of the section and the tongue being of a thickness slightly less than the width of the groove. A transverse opening 24 is formed in each tongue member 22, and aligned transverse openings 25 in the walls of the grooves 23. The openings are adapted to receive fastening pins 26 for tightly fastening the sections together. On the inner peripheral surface of each section 19 and 20, there is formed a plurality of grooves 27 adjacent the ends thereof, which grooves are of dovetail shape in cross section as shown in Figure 7 and are parallel to the plane of the section. Embedded in each groove 27 there is one-half of an O-ring, that is a semicircular section 28, formed of rubber or other resilient material, the ring being preferably circular in cross-section. The O-ring section may be snapped into its seat in the groove and is of such diameter that its inner peripheral edge is adapted to bulge slightly outwardly of the groove so as to grip the shaft 1. The shape of the groove 27 provides a clearance at each corner thereof permitting the O-ring when compressed to flow into the corners of the groove to compensate for such compression.

In the installation of the roller bearing structure, the sections 19 and 20 of the sealing ring are placed around the shaft 1 and the tongue members 22 inserted into the grooves 23 and the overlapping and interlocked parts of the sections fastened together by the pins 26 and with the adjacent ends of the O-ring sections abutting each other. The sections 4 and 5 of the roller bearing are then placed around the shaft with the inner flanges 15 and 16 thereof inserted into and interlocked with the grooves 21 on the outer surface of the sealing ring. These sections are then secured together by the bolts 8. When thus assembled, the flanges 15 and 16 fit loosely in the grooves 21, and the O-rings 28 tightly and firmly and resiliently grip the shaft 1 as shown in Figure 2 so that the oil and grease are held back along the shaft 1 and it is practically impossible for such oil and grease to leak past the O-rings. The O-rings serve as independent seals and provide a better contacting surface on the shaft than a continuous contacting surface. The O-rings also serve as a driver for locking the sealing ring to the shaft so that the flinger portion of the sealing ring rotates with the shaft. The O-rings being of a diameter somewhat greater than the width of the mouths of the grooves 23 can be easily pressed or snapped into and held in the grooves by virtue of the inherent resiliency of the O-rings and can also be readily removed and replaced.

While the invention has been shown in conjunction with a known type of split roller bearing, it will be understood that the sealing ring may be used with other types of split bearings, such as ball bearings, spherical bearings and plain sleeve bearings. It is apparent that the parts of the split bearing structure and of the sealing ring may be readily assembled and disassembled without disturbing the shaft and without disturbing or removing any machine elements that might be mounted on the shaft at the sides of the roller bearing, such as gear wheels, drums, roller and the like.

It will be understood that changes might be made in details of construction without departing from the principle of the invention and it is desired to be limited only by the appended claims.

What is claimed is:

1. For use with a split bearing structure having an opening for a shaft therethrough and at least one inner peripheral flange extending into said opening, a split sealing ring composed of two semi-circular non-resilient complemental sections, said sealing ring having an internal diameter providing for encirclement by the sealing ring of a shaft mounted in said bearing structure and also having an external circumferential groove to loosely receive said annular flange on the bearing structure, means to positively but separably connect the ends of said sealing ring sections for holding the sealing ring in encircling relation to said shaft, each of said sealing ring sections having two grooves spaced apart in its inner surface parallel to the plane of the section and extending circumferentially of the sealing ring with each groove in alignment with the corresponding groove of the other section, and a semi-circular resilient packing ring section in each said groove and extending throughout the length thereof, the adjacent ends of said packing ring sections abutting each other and the inner peripheral surfaces of the packing ring sections projecting outwardly from the corresponding grooves to tightly and firmly resiliently grip said shaft when the sealing ring sections are connected together in encircling relation to said shaft.

2. For use with a split bearing structure having an opening for a shaft therethrough and at least one inner peripheral flange extending into said opening, a split sealing ring composed of two semi-circular non-resilient complemental sections, said sealing ring having an internal diameter providing for encirclement by the sealing ring of a shaft mounted in said bearing structure and also having an external circumferential groove to loosely receive said annular flange on the bearing structure, one end of each section having a tongue projecting therefrom and nicely fitted into a recess in the adjacent end of the other section and said sections having adjacent their ends openings therethrough extending transversely of said tongues and recesses, a fastening element removably fitted into each of said openings thereby to positively but separably connect the ends of said sealing ring sections for holding the sealing ring in encircling relation to said shaft, each of said sealing ring sections having two grooves spaced apart in its inner surface parallel to the plane of the section and extending circumferentially of the sealing ring with each groove in alignment with the corresponding groove of the other section, and a semi-circular resilient packing ring section in each said groove and extending throughout the length thereof, the adjacent ends of said packing ring sections abutting each other and the inner peripheral surfaces of the packing ring sections projecting outwardly from the corresponding grooves to tightly and firmly resiliently grip said shaft when the sealing ring sections are connected together in encircling relation to said shaft.

3. A sealing ring comprising two complemental semi-circular sections, said sealing ring having an internal diameter providing for encirclement by the sealing ring of a cylindrical member, each section having a tongue at one end intermediate the width of the section and disposed approximately parallel to the plane of the section, each section having at its other end a recess intermediate the width of the section and disposed parallel to the plane of the section and of a thickness slightly less than the thickness of said tongue, the tongue of each section being fitted into the recess of the other section, each section having a plurality of grooves spaced apart in its inner surface dovetail shaped in cross section and extending circumferentially of the sealing ring in planes parallel to the plane of the section with each groove in alignment with the corresponding groove of the other section, and a semi-circular resilient packing ring of circular cross section resiliently seated in each groove and extending throughout the length thereof, the adjacent ends of said packing ring sections abutting each other and the inner peripheral surfaces of the packing ring sections projecting outwardly from the corresponding grooves to tightly and firmly grip said cylindrical member when the sealing ring sections are connected together in encircling relation to said member, said sections having openings extending transversely of the respective tongues and recesses with the opening in each end of one ring section in register with the opening in the adjacent end of the other ring section, and pins removably fitted in said openings, extending transversely of the sealing ring thereby to positively but separably connect the ends of said sealing ring sections for holding the sealing ring in encircling relation to said cylindrical member with said packing ring sections in firm resilient contact with said cylindrical member.

References Cited in the file of this patent

UNITED STATES PATENTS

| 398,756 | Swain | Feb. 26, 1889 |
| 1,176,834 | Kennedy | Mar. 28, 1916 |
| 1,294,620 | Clarke | Feb. 18, 1919 |
| 1,798,268 | Mellor | Mar. 31, 1931 |
| 2,585,556 | Johnson | Feb. 12, 1952 |
| 2,704,650 | Rand | Mar. 22, 1955 |
| 2,750,214 | Bermingham | June 12, 1956 |

FOREIGN PATENTS

| 128,449 | Sweden | June 6, 1950 |
| 482,873 | Great Britain | Apr. 6, 1938 |
| 852,632 | Germany | Oct. 16, 1952 |